E. B. WILLIAMS AND B. E. RIEG.
AUXILIARY WINDSHIELD.
APPLICATION FILED MAY 28, 1919.
1,345,053. Patented June 29, 1920.
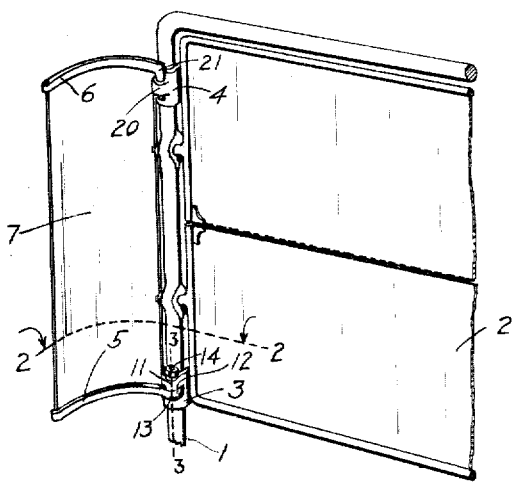
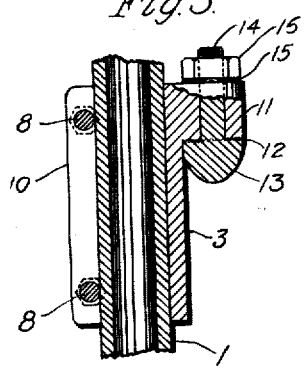
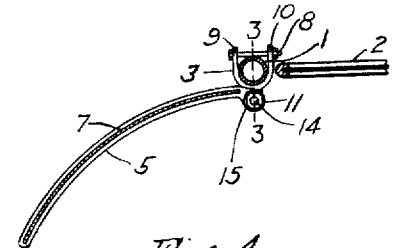
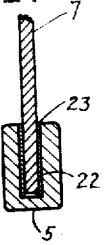
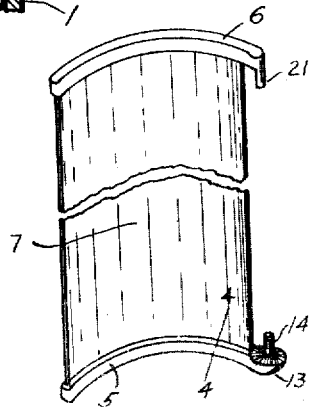
INVENTORS
EARL B. WILLIAMS AND BERNARD E. RIEG.
BY Hazard & Miller
ATTORNEY.

UNITED STATES PATENT OFFICE.

EARL B. WILLIAMS AND BERNARD E. RIEG, OF LOS ANGELES, CALIFORNIA.

AUXILIARY WINDSHIELD.

1,345,053.  Specification of Letters Patent.  Patented June 29, 1920.

Application filed May 28, 1919. Serial No. 300,421.

*To all whom it may concern:*

Be it known that we, EARL B. WILLIAMS and BERNARD E. RIEG, citizens of the United States, residing at Los Angeles, in the county of Los Angeles and State of California, have invented new and useful Improvements in Auxiliary Windshields, of which the following is a specification.

Our object is to make an improved auxiliary wind shield, and our invention consists of the novel features herein shown, described and claimed.

Specifically an object of our invention is to make auxiliary wind shields to extend outwardly from the main wind shield, the auxiliary wind shields to be curved in horizontal planes with the convex sides forwardly and outwardly from the operator, and the bodies of the auxiliary wind shields to be clear glass.

Figure 1 is a fragmentary perspective of a part of a main wind shield provided with an auxiliary wind shield in accordance with the principles of our invention, the view being taken from the operator's position.

Fig. 2 is a horizontal sectional detail on the line 2—2 of Fig. 1 and looking downwardly as indicated by the arrows.

Fig. 3 is an enlarged vertical sectional detail on the lines 3—3 of Figs. 1 and 2.

Fig. 4 is an enlarged fragmentary cross section, the view being taken on the line 4—4 of Fig. 5.

Fig. 5 is a perspective of the auxiliary wind shield disconnected from the clamps.

Referring to the drawing in detail, the side bar 1 supports one side of the main wind shield construction 2, the clamps 3 and 4 are mounted upon the side bar 1, the curved arms 5 and 6 extend from the clamps 3 and 4, and the curved auxiliary wind shield glass 7 is fixed upon the arms 5 and 6.

The clamp 3 is U-shaped in plan, as shown in Fig. 2, and straddles the side bar 1, and a bolt 8 is inserted through the ends of the clamp to pinch the arms 9 and 10 against the side bar 1 and to hold the side bar 1 in the space between the arms 9 and 10. A bearing 11 extends from the clamp 3 and has a corrugated lower face 12.

The arm 5 is curved in plan and channel-shaped in cross section and has a head 13 provided with a corrugated face fitting the corrugated face 12. A stud bolt 14 extends from the head 13 through the bearing 11, a spring washer 15 is placed upon the bearing 11, and a nut 16 is placed upon the stud against the spring washer, so that when the nut is properly adjusted the arm 5 may be forcibly moved in a horizontal plane, the corrugated faces slipping upon each other, and so that the tension of the spring washer will hold the arm 5 in an adjusted position.

The clamp 4 is similar to the clamp 3 and has a bearing 20.

The arm 6 has a pintle 21 extending downwardly at right angles and fitting in the bearing 20. The arm 6 is identical with the arm 5. The arms 5 and 6 have channels 22. A rubber packing 23 is placed around the upper and lower ends of the glass 7 and the glass is pressed into the channels, so that the packing forms a cushion between the glass and the metal. The channels 22 are of considerable depth and when the glass is pressed tightly into the channels a reasonable rigid construction is produced.

It is to be understood that the same construction is to be provided at both sides of the main wind shield 2, the only difference being that the parts may be made right and left.

The auxiliary wind shield will present less resistance to a head wind on account of the convex face against which the wind strikes, and will make a better shed to protect the persons behind the wind shield from the force of the wind.

Another important advantage of the curved glass 7 is that it will present an easier vision. The curvatures of the glass will be substantially concentric to the eye of the observer when in the operator's seat, and when the automobile is moving the object viewed through the glass will travel in a direct right angle to the face of the curved glass. This principle is well known in optics and is applied by optical manufacturers in making spectacles.

Another important feature is that the air or head wind will travel around the outer curved face of the auxiliary wind shield and leave the auxiliary wind shield in a line parallel with the line of travel of the automobile.

Various changes may be made without departing from the spirit of our invention as claimed.

We claim:

1. The combination with a main plane windshield, of a rearwardly curved auxiliary windshield pivoted so as to be adjustable to different angular positions radiating from the side line of the main windshield.

2. The combination with a main plane windshield and its support, of a rearwardly curved auxiliary windshield pivoted on the support so as to be adjustable to different angular positions radiating from the side line of the main windshield.

3. The combination, with a windshield and its support, of a set of clamps attachable to the support, pivot lugs on the clamps, and an auxiliary windshield having at one end a downturned pivot pin to engage one of the lugs, and at its other end a roughened ear with a clamping bolt extending from said ear for connecting the ear to the adjacent pivot lug, whereby the auxiliary shield is so connected as to be angularly adjustable about the adjacent side of the main shield.

In testimony whereof we have signed our names to this specification.

EARL B. WILLIAMS.
BERNARD E. RIEG.